(12) United States Patent
Talaski et al.

(10) Patent No.: US 9,055,114 B1
(45) Date of Patent: Jun. 9, 2015

(54) PACKET PARSING AND CONTROL PACKET CLASSIFICATION

(75) Inventors: David Talaski, Los Altos, CA (US); Avanindra Godbole, San Jose, CA (US); Jean Marc Frailong, Los Altos Hills, CA (US); Fanyun Kong, San Lorenzo, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 165 days.

(21) Appl. No.: 13/334,961

(22) Filed: Dec. 22, 2011

(51) Int. Cl.
*H04L 12/54* (2013.01)
*H04L 29/06* (2006.01)
*H04L 12/46* (2006.01)
*G06F 17/30* (2006.01)

(52) U.S. Cl.
CPC .............. *H04L 69/22* (2013.01); *H04L 12/465* (2013.01); *H04L 12/4645* (2013.01); *G06F 17/30982* (2013.01); *H04L 12/5689* (2013.01)

(58) Field of Classification Search
CPC .. G11C 15/00; G11C 15/04; G06F 17/30982; H04L 45/7453; H04L 45/00; H04L 12/4641; H04L 12/4645; H04L 12/467
USPC .......................................................... 711/108
See application file for complete search history.

(56) References Cited

U.S. PATENT DOCUMENTS

| 7,492,763 | B1* | 2/2009 | Alexander, Jr. | 370/389 |
|---|---|---|---|---|
| 7,782,856 | B1* | 8/2010 | Larsen et al. | 370/392 |
| 2004/0156371 | A1* | 8/2004 | Kumar et al. | 370/401 |
| 2004/0165588 | A1* | 8/2004 | Pandya | 370/389 |
| 2004/0258062 | A1* | 12/2004 | Narvaez | 370/389 |
| 2005/0226242 | A1* | 10/2005 | Parker | 370/389 |
| 2006/0104268 | A1* | 5/2006 | Lee et al. | 370/389 |
| 2006/0203721 | A1* | 9/2006 | Hsieh et al. | 370/229 |
| 2008/0112403 | A1* | 5/2008 | Larsen et al. | 370/389 |
| 2010/0142537 | A1* | 6/2010 | Lee et al. | 370/395.53 |

* cited by examiner

*Primary Examiner* — Charles Rones
*Assistant Examiner* — Andrew Russell
(74) *Attorney, Agent, or Firm* — Harrity & Harrity, LLP

(57) ABSTRACT

A system may include receiving a packet, of a packet stream, including control tags in a header portion of the packet and classifying each of the control tags into a category selected from a set of possible categories. The set of possible categories may include an unambiguous interposable (UI) category that is assigned to a control tag that corresponds to an unambiguous parsing interpretation and that is interposable within a sequence of the control tags, and an ambiguous interposable (AI) category that is assigned to a control tag in which the control tag has an ambiguous parsing interpretation and in which the control tag is interposable within the sequence of the control tags. The method may further include determining parsing operations to perform for the packet based on the classified categories of the control tags and based on the packet stream of the packet.

22 Claims, 9 Drawing Sheets

US 9,055,114 B1

PACKET PARSING AND CONTROL PACKET CLASSIFICATION

BACKGROUND

Computing and communication networks typically include nodes, such as routers, firewalls, switches, or gateways, which transfer or switch data, such as packets, from one or more sources to one or more destinations. The nodes may operate on the packets as the packets traverse the network, such as by forwarding or filtering network traffic defined by the packets.

Ethernet is a common network technology that is used by nodes in forwarding network traffic. In an Ethernet connection, nodes may divide a stream of data into individual packets called frames. Each frame may contain, in addition to the substantive payload data that is to be transmitted by the frame, header information, such as source and destination addresses, priority or control information, and error-checking data. The header information may particularly include one or more tags that provide control information relating to the priority classification of the frame. Higher priority frames may be given preference, relative to lower priority frames, when being processed by a node.

The number and size of the tags in a frame may vary. Properly interpreting the tags when processing a frame can be a difficult task.

SUMMARY

In one implementation, a method may include receiving a packet, of a packet stream, including control tags in a header portion of the packet; classifying each of the control tags into a category selected from a set of possible categories, where the set of possible categories includes: an unambiguous interposable (UI) category that is assigned to a control tag that corresponds to an unambiguous parsing interpretation and that is interposable within a sequence of the plurality of control tags, and an ambiguous interposable (AI) category that is assigned to a control tag in which the control tag has an ambiguous parsing interpretation and in which the control tag is interposable within the sequence of the control tags. The method may further include determining parsing operations to perform for the packet based on the classified categories of the control tags and based on the packet stream of the packet. The method may further include performing the determined parsing operations.

In another possible implementation, a device may include a category determination component to classify control tags in a packet, associated with a packet stream, based on EtherType fields of the control tags, where the control tags may be classified as a category selected from a set of possible categories, where the set of possible categories may include: an UI category that is assigned to a control tag that corresponds to an unambiguous parsing interpretation and that is interposable within a sequence of control tags in the packet, and an AI category that is assigned to a control tag in which the control tag has an ambiguous parsing interpretation and in which the control tag is interposable within the sequence of the control tags in the packet. The device may further include a ruleset lookup component to determine parsing operations to perform, for the packet, based on the categories of the control tags and based on the packet stream of the packet. The device may further perform the determined parsing operations.

In another possible implementation, a network device may include ports to receive network traffic of a number of packets, where at least some of the packets may include control tags in header portions of the packets; and a switching mechanism to process the received network traffic. The switching mechanism may include logic to classify the control tags in the header portions of the packets, based on EtherType fields of the control tags, where the control tags may be classified as a category selected from a set of possible categories, where the set of possible categories may include categories determined based at least on whether a control tag ambiguously or unambiguously determines parsing of the control tag. The device may further include logic to determine parsing operations to perform, for the packets, based on the categories of the control tags and based on a packet stream of the packet.

In another implementation, a device may include content addressable memories (CAMs) arranged in a pipeline, the CAMs to receive input values that include information based on packet headers, and to output values indicating the input values match entries in the CAMs. The device may further include logic components, arranged to correspond to the CAMs, the logic components operating as buffering or synchronization logic for the pipeline, at least one of the logic components being configured to, based on the output values of one or more of the CAMs, output an indication that a particular packet being processed by the pipeline is a control packet.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Systems and/or methods, described herein, may enable a network node to identify and categorize tags that are included within control information of a packet. The tags may be classified based on an associated EtherType field. In one implementation, the tags may be classified into one of three categories: ambiguous and interposable (AI), unambiguous and interposable (UI), and unambiguous and non-interposable (UN). The packet may be processed based on the classifications of one or more of the tags. Instructions for processing the frame may be determined based on the categorization of the tags of the frame and may be flexibly defined on a per-port basis.

Systems and/or methods consistent with another aspect, described herein, may identify control packet. Control packets may be identified using a pipeline based on a series of content addressable memories (CAMs). Control packets may be, for example, offloaded for additional processing in the control plane.

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data. An Ethernet packet, which may also commonly be referred to as a frame, will be referenced for the implementations described herein. The concepts described herein may broadly be applied to other, non-Ethernet, network and/or communication technologies.

Figure 1:
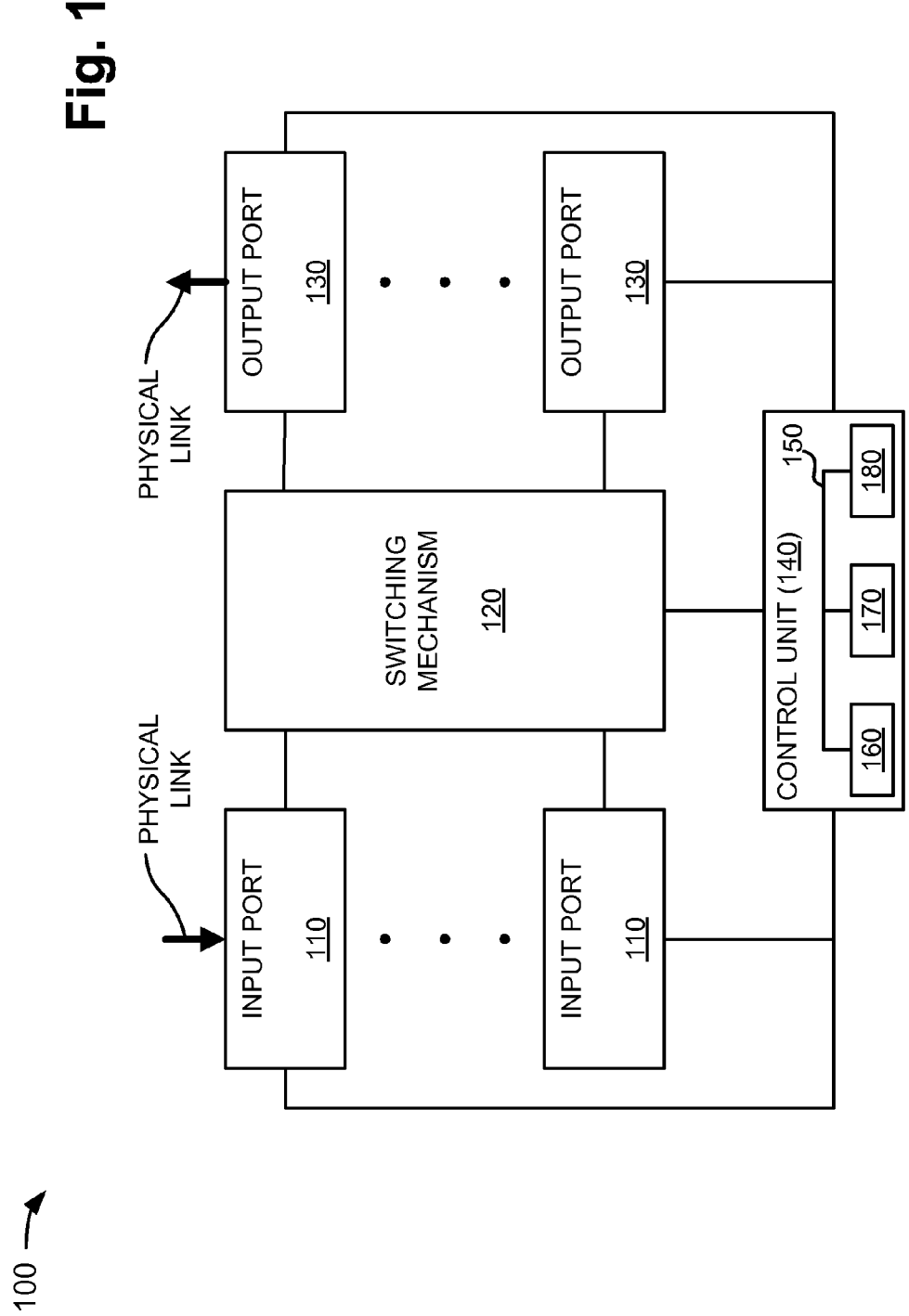
FIG. 1 is a diagram of example components of a device that may correspond to a network device or node.

FIG. 1 is a diagram of example components of a device 100 that may correspond to a network device or node. Device 100 may be, for example, a router, a switch, a firewall, a gateway, a network security device, or another type of device, that routes and/or forwards packets. For example, device 100 may include a high capacity switch or router to forward Ethernet packets to other nodes in a network. In some implementations, device 100 may be a component, such as a chip or a card, in a larger device. For example, device 100 may be a card in a router and may forward packets to other cards in the router. As shown in FIG. 1, device 100 may include input ports 110, a switching mechanism 120, output ports 130, and a control unit 140.

Input ports 110 may be a point of attachment for physical links and may be a point of entry for incoming traffic, such as packets. Input ports 110 may carry out data link layer encapsulation and/or decapsulation.

Switching mechanism 120 may connect input ports 110 with output ports 130. Switching mechanism 120 may generally provide the data plane path, for device 100, between input ports 110 and output ports 130. In other words, switching mechanism 120 may perform functions relating to the processing of packets received at device 100. Switching mechanism 120 may be implemented using many different techniques. For example, switching mechanism 120 may be implemented via busses, crossbars, application specific integrated circuits (ASICs), and/or shared memories which may act as temporary buffers to store traffic, from input ports 110, before the traffic is eventually scheduled for delivery to output ports 130. In general, switching mechanism 120 may be designed as a high-throughput component, such as one implemented in hardware.

In general, switching mechanism 120 may store packets and may schedule packets for delivery on output physical links. Switching mechanism 120 may include scheduling algorithms that support priorities and guarantees. Switching mechanism 120 may support data link layer encapsulation and decapsulation, and/or a variety of higher-level protocols. Switching mechanism 120 will be described in more detail below.

Output ports 130 may be a point of attachment for physical links and may be a point of egress for outgoing traffic. Output ports 110 may carry out data link layer encapsulation and/or decapsulation. The designation of whether a port is an input port 110 or output port 130 may be arbitrary. A port may function as either an input port or an output port, or as both an input port and an output port.

Control unit 140 may implement routing protocols and/or switching protocols to generate one or more routing and/or forwarding tables, such as tables that may be used by switching mechanism 120. Control unit 140 may generally represent the control plane for device 100. Control unit 140 may connect with input ports 110, switching mechanism 120, and output ports 130. Control unit 140 may also run software to configure and manage device 100.

In an example implementation, control unit 140 may include a bus 150 that may include a path that permits communication among a processor 160, a memory 170, and a communication interface 180. Processor 160 may include one or more processors, microprocessors, ASICs, field-programmable gate arrays (FPGAs), or other types of processing units that interpret and execute instructions. Memory 170 may include a random access memory (RAM), a read only memory (ROM) device, a magnetic and/or optical recording medium and its corresponding drive, and/or another type of static and/or dynamic storage device that may store information and instructions for execution by processor 160. Communication interface 180 may include any transceiver-like mechanism that enables control unit 140 to communicate with other devices and/or systems.

Device 100 may perform certain operations, as described herein. Device 100 may perform these operations in response to processor 160 executing software instructions contained in a computer-readable medium, such as memory 170. A computer-readable medium may be defined as a non-transitory memory device. A memory device may include space within a single physical memory device or spread across multiple physical memory devices. The software instructions may be read into memory 170 from another computer-readable medium, such as a data storage device, or from another device via communication interface 180. The software instructions contained in memory 170 may cause processor 160 to perform processes described herein. Alternatively, hardwired circuitry may be used in place of or in combination with software instructions to implement processes described herein. Thus, implementations described herein are not limited to any specific combination of hardware circuitry and software.

Although FIG. 1 shows example components of device 100, in other implementations, device 100 may include fewer components, different components, differently arranged components, or additional components than depicted in FIG. 1. Alternatively, or additionally, one or more components of device 100 may perform one or more other tasks described as being performed by one or more other components of device 100.

Figure 2:
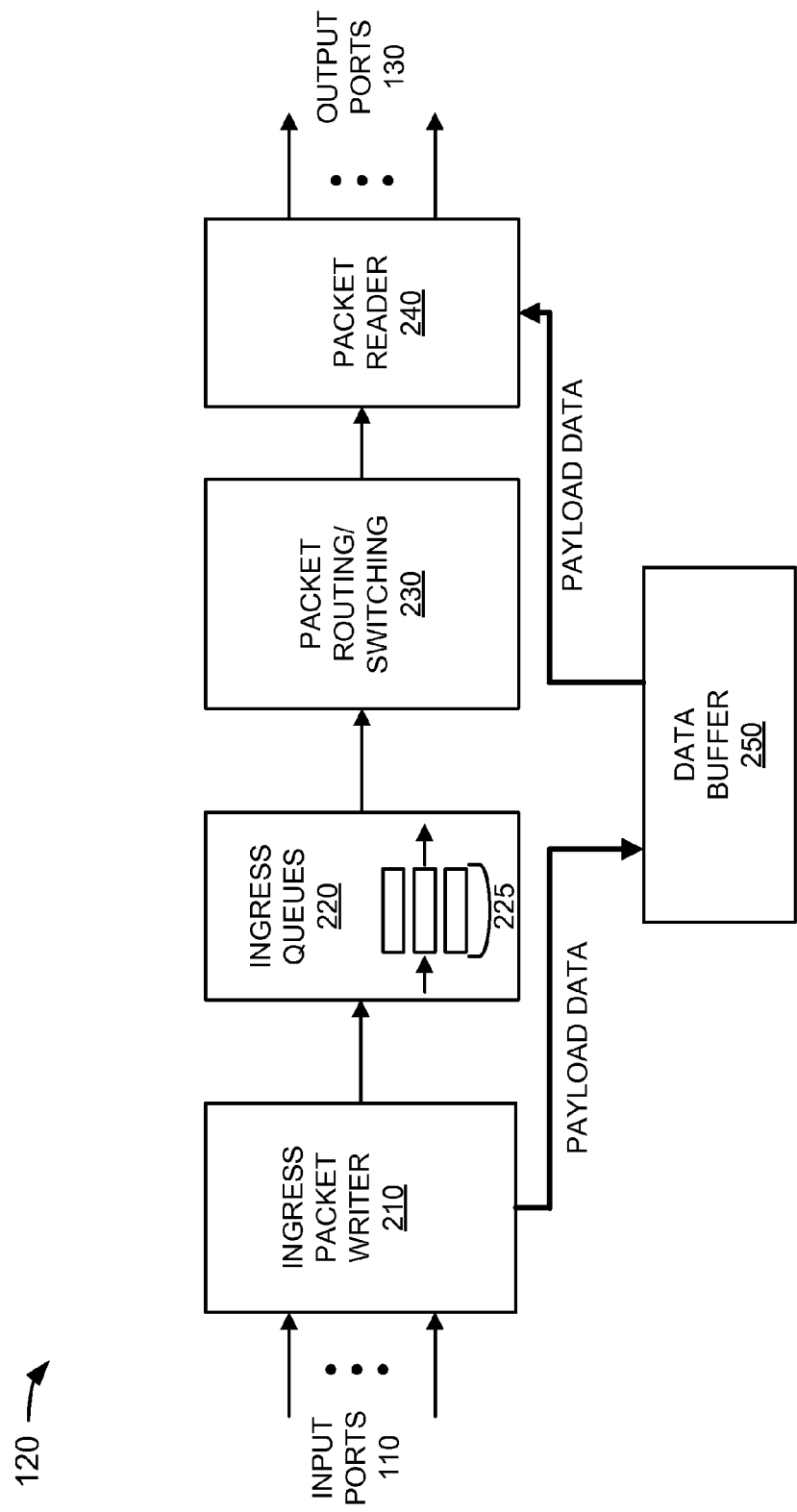
FIG. 2 is a diagram illustrating an example of an implementation of a switching mechanism of FIG. 1.

FIG. 2 is a diagram illustrating an example of an implementation of switching mechanism 120. As shown, switching mechanism 120 may include an ingress packet writer 210, ingress queues 220, a packet routing/switching component 230, a packet reader 240, and a data buffer 250. Components of switching mechanism 120 related to layer 2 packet parsing and control packet classification will be particularly described.

Ingress packet writer 210 may receive packets from input ports 110 and separate the control information and payload data of the received packets. In one implementation, ingress packet writer 210 may store the payload data in data buffer 250 and forward the control information of the packet, such as the Ethernet header information, to ingress queues 220. In some implementations, some or all of the control information for a packet may also be stored in data buffer 250. In these implementations, a reference to the packet header control information or select portions of the packet header control information may be forwarded to ingress queues 220. Ingress packet writer 210 may also be configured to determine, based on the packet header control information, a priority classification for each of the incoming packets.

Ingress queues 220 may generally operate to store packet control information, or references to packets, in queues, such as a quantity of first-in first-out (FIFO) queues 225. For example, switching mechanism 120 may be configured to support a quantity of traffic priority classes, such as high priority, standard priority, and best effort (low priority). In one implementation, the priority class for a packet may be specified as a three-bit (eight priority class) value. The particular traffic priority class for a packet may be determined by ingress packet writer 210 and the packet control information, or a reference to the packet, may be input to one of queues 225 based on the priority class.

Packet routing/switching component 230 may operate to read packet control information or references to packets from queues 225, determine an appropriate output port(s) 130 for the read packets and/or determine new header information for the packets, and forward this information to packet reader 240. Packet routing/switching component 230 may read from queues 225 at a rate based on the priority class corresponding to each of queues 225. For example, packet control information in a queue corresponding to high priority traffic may be read whenever the queue is not empty while packet control information in a queue corresponding to best effort traffic may be read whenever the higher priority queues are empty. In determining an appropriate output port(s) 130 for the packet control information, packet routing/switching component 230 may use one or more routing or forwarding tables received from control unit 140.

The operations performed by packet routing/switching component 230 may include an initial ingress processing in which EtherType fields may be extracted, control packets may be recognized, and semantic parsing, based on the extracted EtherType fields, may be performed, as described in more detail below.

Packet reader 240 may operate to reassemble packets processed by packet routing/switching component 230. For example, packet reader 240 may receive packet header control information from packet routing/switching component 230. Packet reader 240 may obtain the corresponding payload data, for the packet header control information, from data buffer 250, and concatenate the packet header control information and the payload data to form a reassembled (whole) packet. Packet reader 240 may forward the reassembled packet to the appropriate output port(s) 130.

Data buffer 250 may include a memory and associated control circuitry for buffering packet data received from ingress packet writer 210. Data buffer 250 may include, for example, high-speed dynamic RAM, static RAM, or another type of memory.

Although FIG. 2 shows example components of switching mechanism 120, in other implementations, switching mechanism 120 may include fewer components, different components, differently arranged components, or additional components than depicted in FIG. 2. Alternatively, or additionally, one or more components of switching mechanism 120 may perform one or more other tasks described as being performed by one or more other components of switching mechanism 120.

As previously mentioned, packets received by device 100 may include packet control information that may be used by switching mechanism 120 in processing the packet. The packet control information may include a number of control tags, such as EtherType tags. The tags may be used to determine protocols used by the packet, the priority classification of the packet, virtual LAN (VLAN) information relating to the packet, or for other purposes. In some cases, tags may be parsed and interpreted individually. In other cases, a tag may be ambiguous by itself and may need to be interpreted in the context of other tags.

Figure 3:
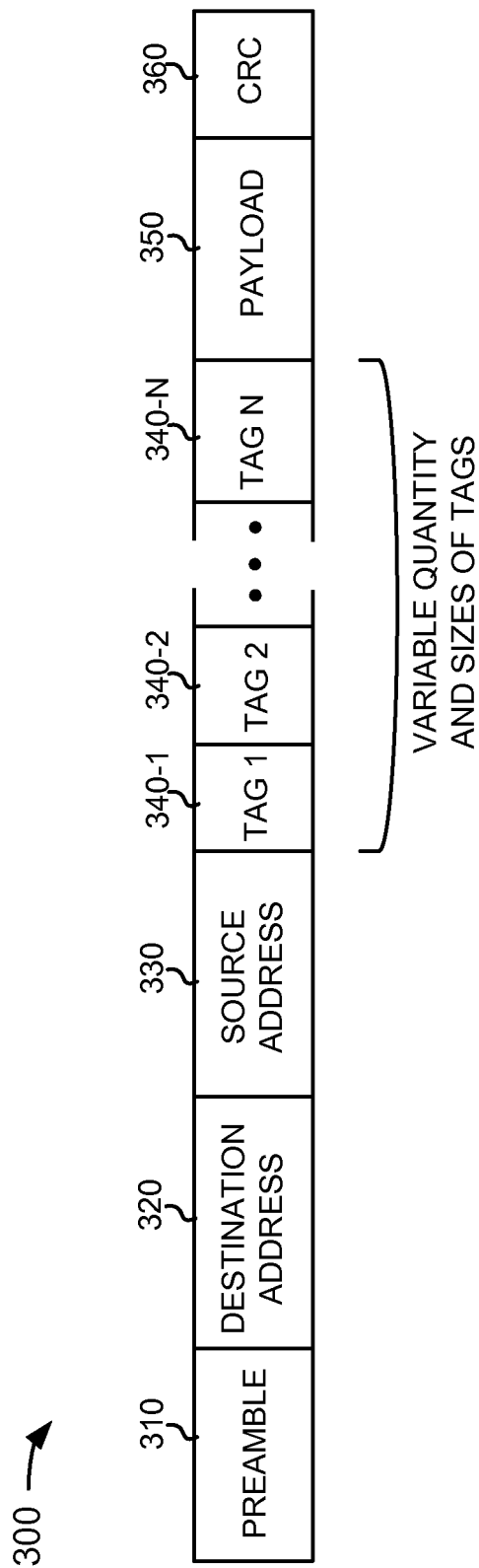
FIG. 3 is a diagram illustrating an example layout of fields in a packet.

FIG. 3 is a diagram illustrating an example layout of fields in a packet 300, such as an Ethernet packet received by ingress packet writer 210. As shown in FIG. 3, packet 300 may contain a number of fields, including: a preamble field 310, a destination field 320, a source field 330, a variable quantity of tags 340-1 through 340-N (N>=1) (referred to collectively as "tags 340" or individually as "tag 340"), payload data 350, and an error check (CRC) field 360. In alternative implementations, other fields or additional fields may be included in packet 300.

Preamble field 310 may include a pattern of bits that allows devices to detect a new incoming packet 300. Preamble field 310 may be, for example, eight octets, where an octet is an eight bit value. Destination field 320 and source field 330 may include destination and source address information for packet 300. Destination field 320 and source field 330 may each be, for example, six octets in length and include a media access control (MAC) address or an Internet Protocol (IP) address.

Tags 340 may include control tags for packet 300. A packet may have a variable number of control tags. In one implementation, tags 340 may include, for example, EtherType tags. Each of tags 340 may begin with a two octet tag protocol ID (TPID) field, also called the EtherType field or value, that identifies the type of the tag. Tags 340 may include a number of different types of tags, which may indicate different protocols that are encapsulated in packet 300 or priority classes for packet 300. Tags 340 may also include VLAN tags, MPLS tags, or other types of tags. Tags 340 may be of different lengths, depending on the type of the tag. For example, some of tags 320 may be two octet tags while other tags may be four or six octet tags.

Payload data 350 may include the substantive data for packet 300. Error check field 360 may include data that may be used to detect errors within packet 300. For example, error check field 360 may include a 32-bit cyclic redundancy check value.

Figure 4:
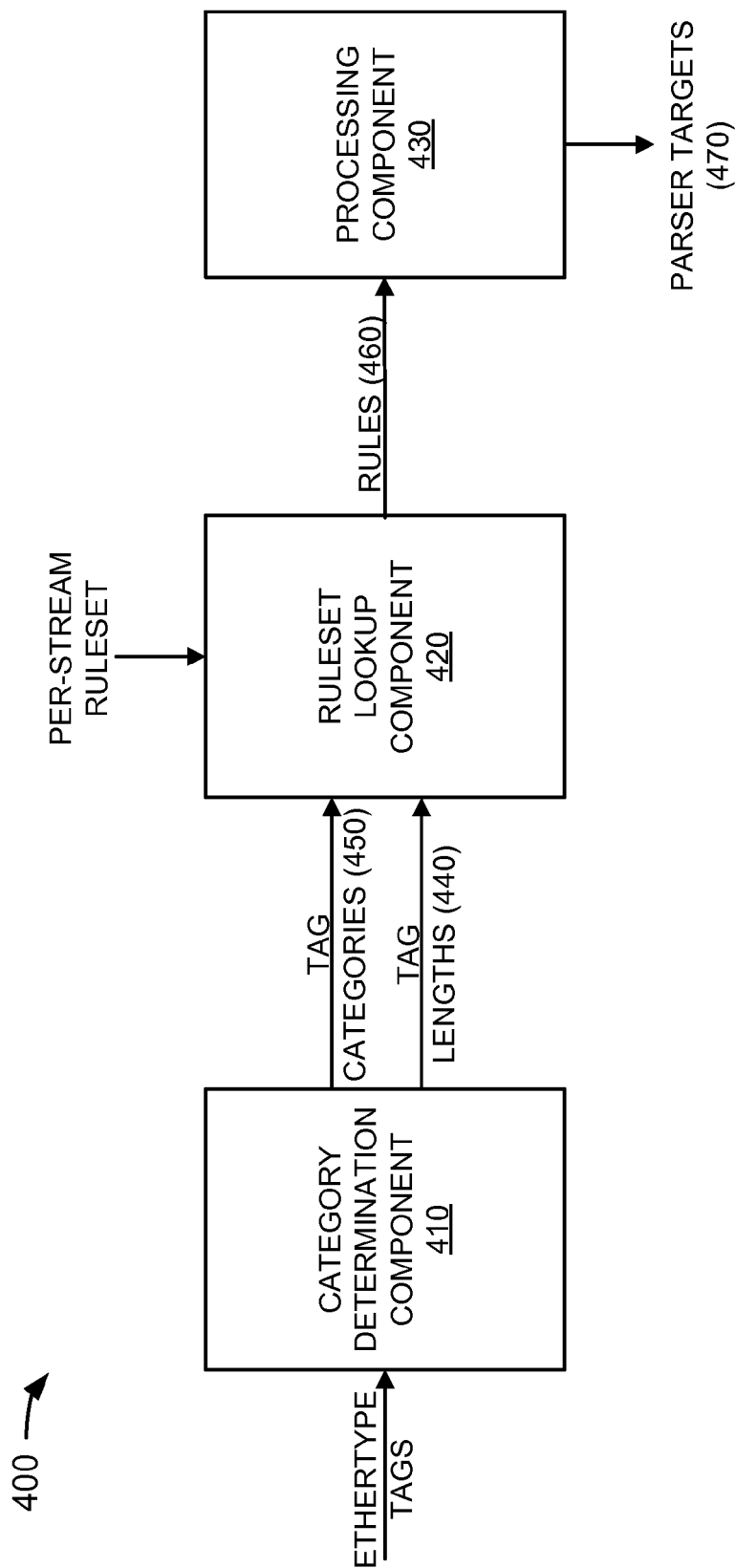
FIG. 4 is a diagram conceptually illustrating components relating to the semantic parsing of EtherType tags.

FIG. 4 is a diagram conceptually illustrating components 400 relating to the semantic parsing of EtherType tags by packet routing/switching component 230. Components 400 may include a category determination component 410, ruleset lookup component 420, and processing component 430.

Category determination component 410 may receive, as a stream of data, tags 340 for a particular packet. As previously mentioned, the number and/or size of tags 340 may be variable and may not be known in advance. Category determination component 410 may lookup each tag based on the fixed length EtherType field of each tag 340. From the EtherType field, category determination component 410 may determine the lengths of each of the tags 340, illustrated as tag lengths 440, as well as a category for each of the tags 340, illustrated as tag categories 450. The length of each tag may be used to determine the location of the beginning of the next tag in the stream of data.

In one implementation, tag lengths 440 and tag categories 450 may be determined through a lookup using a content addressable memory (CAM) or ternary CAM (TCAM). In general, a CAM includes a type of associative memory designed so that an input data word may be simultaneously compared to the entire CAM memory to determine whether the data word matches a corresponding entry in the CAM. Because a CAM is designed to search its entire memory in a single operation, a CAM lookup may be faster than a search of all memory locations of a traditional RAM. A TCAM is a type of CAM in which selected values for entries in the CAM may be specified as "don't care" values.

In one implementation, each of tag categories 450 may be selected from a set including three possible categories: UI, AI, or UN. UI tags (unambiguous interposable) may be tags that are uniquely identified by their EtherType field and may appear anywhere in the sequence of tags for a packet. Additionally, tags that are unknown because of the development of a new protocol or modification of an existing protocol may be classified as UI tags that are effectively skipped during processing. AI tags (ambiguous interposable) may include tags that cannot be uniquely identified by their EtherType field and may appear anywhere in the sequence of tags for a packet. AI tags may require additional interpretation steps in order to properly parse the tags. For example, an AI tag may be interpreted based on the current AI tag, based on a group of AI tags for the current packet, and a count of the number of tags for the current packet. UN tags (unambiguous non-interposable) may be tags that are uniquely identified by their EtherType field and may only appear as the final tag in the sequence of tags for a packet. UN tags may indicate the end of layer 2 header processing.

Examples of UI tags may include tags for the IEEE 802.1ad protocol, tags for the IEEE 802.1ah protocol, QCN_ID tags, and QCN_CN tags. Examples of AI tags may include Ether-Type values 8100 and 9100. Examples of UN tags may include IPv4 tags, IPv6 tags, multi-protocol label switching (MPLS) tags, and fibre channel tags.

Tag lengths 440 and/or tag categories 450 may be used by ruleset lookup component 420 to determine rules that will be used to process tags 340. Ruleset lookup component 420 may parse and/or interpret tags 340 according to tag categories 450. In one implementation, the rules and/or instructions that are used to process a packet may be specified by a number of data structures and/or instructions ("rules 460"), and the results of the application of the data structures and/or instructions may be stored in destinations referred to as "parser targets" herein. The rules 460, and hence the parser targets may be application-dependent (e.g., stream or port dependent) and a particular packet may be associated with multiple parser targets. Each parser target may include information taken from one or more tags. Ruleset lookup component 420 may determine rules 460, for a frame, based on tag categories 450 (and possibly based on other information).

In one implementation, the particular ruleset that is used by ruleset lookup component 420 may be determined on a per-application basis. For example, a different ruleset may be used for different traffic streams or for different ports.

Processing component 430 may receive rules 460. Processing component 430 may perform the substantive downstream processing, based on rules 460, of the packet header, to generate parser targets 470. Processing component 430 may perform destination lookup and/or perform other functions relating to the substantive routing or switching of packets input to device 100. In one implementation, some rules 460 may include data structures that processing component 430 may use to directly process, in hardware, the packet and/or a tag associated with the packet. Other rules 460 may reference software instructions or procedures, such as control plane processing performed by control unit 140, that may be implemented or called by processing component 430.

Although FIG. 4 shows example components 400 relating to the parsing of tags, in other implementations, fewer components, different components, differently arranged components, or additional components than depicted in FIG. 4, may be used. Alternatively, or additionally, one or more of components 400 may perform one or more other tasks described as being performed by one or more other components 400.

Figure 5:
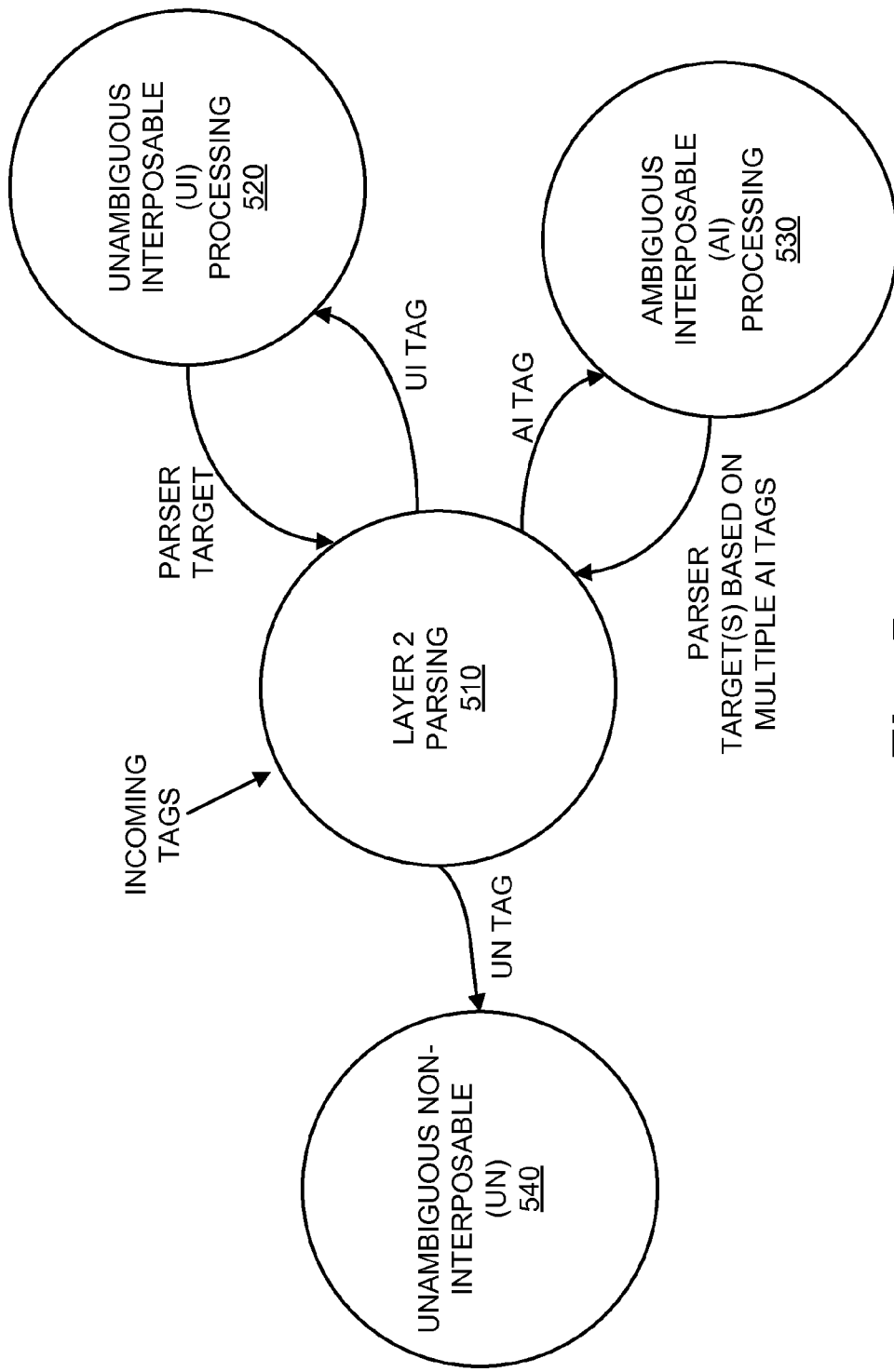
FIG. 5 is a state diagram conceptually illustrating an example of the processing flow that may be performed during packet parsing.

FIG. 5 is a state diagram conceptually illustrating an example of a processing flow that may generally be performed by category determination component 410, ruleset lookup component 420, and/or processing component 430.

As illustrated in FIG. 5, parsing may be performed, such as by ruleset lookup component 420 and processing component 430, based on the category type of each tag. Tags and tag categories 540 may be used to perform tag processing, such as layer 2 parsing (layer 2 parsing 510). Incoming UI, AI, and UN tags may each be processed differently.

Incoming UI tags may trigger UI processing 520. In UI processing 520, the EtherType field, corresponding to a tag, may be used to directly lookup, in the ruleset corresponding to the current stream, the processing rules for the tag. The processing rules may take parameters based on information in the tag. Some tags categorized as UI tags may include tags that are unknown. In this case, no processing may be performed, allowing layer 2 parsing to continue without being blocked.

Incoming AI tags may trigger AI processing 530. AI processing 530 may generally require multiple tags in order to generate parser targets. Incoming AI tags for a packet may be stored, in a tag stack, which may be interpreted, using the stack of AI tags, to determine how the AI tags are mapped to parser target(s). AI processing 530 is described in more detail below with reference to FIG. 7.

A UN tag may only appear as the final tag in the sequence of tags for a packet. The incoming UN tag may trigger UN processing 540. In UN processing, the EtherType field, corresponding to the UN tag, may be used to directly lookup, in the ruleset corresponding to the current stream, the processing for the tag. The UN tag may commonly trigger layer 3 parsing or trigger the end of parsing for the packet.

An example of a number of possible EtherTypes, the corresponding tag category, and the next stage of processing, are illustrated in Table I, below. The values in Table I may be predetermined by, for example, an administrator. In Table I, the first column includes the TPID field value for each Ether-Type, the second column includes the corresponding Ether-Type name or label, the third column includes the category type (AI, UI, UN), and the fourth column describes next stage processing (as illustrated in FIG. 5). For example, for the first entry, for EtherType value "0x8100" (EtherType label ETYP_QTAG), the tag category may be AI and the next stage processing may be "continue layer 2 parsing." In the context of FIG. 5, reception of this EtherType may correspond to processing flow from AI processing 530 back to layer 2 processing 510. Similarly, for the last entry in Table I, corresponding to the EtherType value "0x88CC" (EtherType label ETYP_LLDP), the tag category may be UN and the next stage processing may be "stop parsing." Reception of this Ether-Type may correspond to the processing flow to UN processing 540 and stopping. As another example, reception of an unknown EtherType value/label may correspond to the category UI and the next stage may be "continue layer 2 parsing." Receipt of an unknown EtherType may effectively cause the EtherType to be skipped and parsing to continue.

TABLE I

| EtherType Label | EtherType Value | Category | Next Stage |
| --- | --- | --- | --- |
| ETYP_QTAG | 0x8100 | AI | Continue Layer 2 Parsing |
| ETYP_STAG_0 | 0x9100 | AI | Continue Layer 2 Parsing |

TABLE I-continued

| EtherType Label | EtherType Value | Category | Next Stage |
|---|---|---|---|
| ETYP_STAG_1 | 0x9200 | AI | Continue Layer 2 Parsing |
| ETYP_QCN_ID | TBD | UI | Continue Layer 2 Parsing |
| ETYP_QFC_ID | TBD | UI | Continue Layer 2 Parsing |
| UNKNOWN TAG | NOT KNOWN | UI | Continue Layer 2 Parsing |
| ETYP_FCoE | 0x8906 | UN | Layer 3 Parsing |
| ETYP_IPv4 | 0x0800 | UN | Layer 3 Parsing |
| ETYP_IPv6 | 0x86DD | UN | Layer 3 Parsing |
| ETYP_MPLS_UC | 0x8847 | UN | Layer 3 Parsing |
| ETYP_MPLS_MC | 0x8848 | UN | Layer 3 Parsing |
| ETYP_ARP | 0x0806 | UN | Stop Parsing |
| ETYP_RARP | 0x8035 | UN | Stop Parsing |
| ETYP_LLDP | 0x88CC | UN | Stop Parsing |

Figure 6:
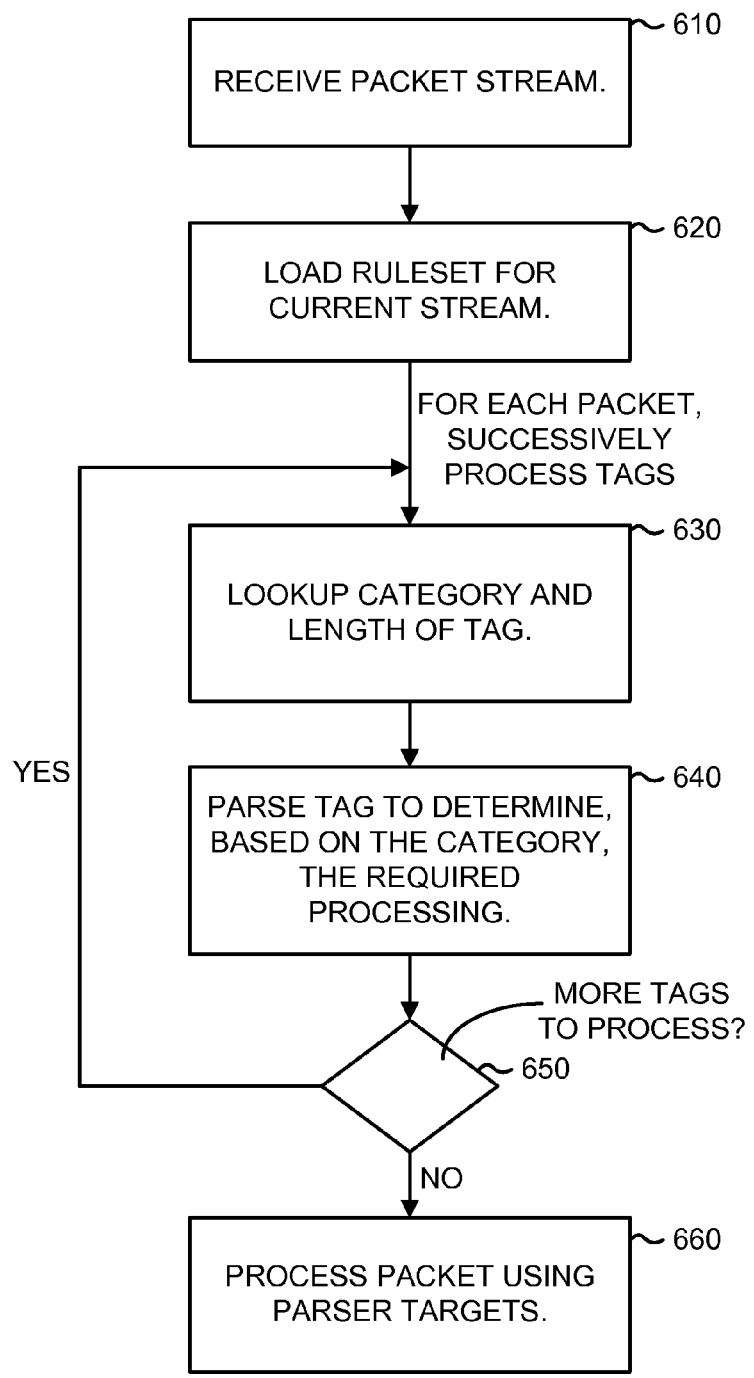
FIG. 6 is a flow chart illustrating an example process for performing parsing and interpretation.

FIG. 6 is a flow chart illustrating an example process 600 for performing parsing and interpretation. In one implementation, process 600 may be performed, for example, by routing/switching component 230 of device 100.

Process 600 may include receiving one or more packets from an input packet stream (block 610). As previously mentioned, rulesets for packet processing may be implemented on a per-stream basis, such as a packet stream corresponding to a particular application. In some implementations, a packet stream may correspond to, for example, a particular input port 110, and accordingly, processing may therefore be performed on a per-port basis.

Process 600 may further include loading of the rule set for the current stream (block 620). In one implementation, loading of the rule set for the current stream may include loading a ruleset into a memory that may be accessed based on an index value that is output as a result of a CAM lookup performed by category determination component 410. For example, category determination component 410 may apply an EtherType field value to a CAM or TCAM. The output of the CAM (or TCAM) may be an index value corresponding to the first match in the CAM (or TCAM). The index value may be used to index a memory storing the ruleset to obtain information relating to the lookup, such as tag categories 450 and tag lengths 440.

Process 600 may further include, for each received packet, successively processing of the tags of the packet, as illustrated in blocks 630-650. Process 600 may include, for a tag of a particular packet, looking up the category and length of the tag (block 630). For example, as previously discussed, category determination component 410 may use a CAM to lookup the EtherType field for a tag, to obtain information such as the length of the tag and the category of the tag. In one implementation, the lookup into the CAM may return an index value that references an entry in a ruleset corresponding to the packet stream, where the entry in the ruleset may include the length of the tag and the category corresponding to the tag.

Process 600 may further include parsing the tag to determine, based on the category for the tag, processing that is indicated by the tag (block 640). As previously discussed, the processing may be resolved into one or more parser targets. Certain tag categories, such as the UN category, may directly correspond to the parser target. Other tag categories, such as the AI category, may require a more complex interpretation to obtain the corresponding parser targets. For instance, multiple received tags corresponding to the AI category may be may be saved in a tag stack and then analyzed as a group.

Process 600 may further include determining whether the current packet includes additional tags to be processed (block 650). Processing of tags for a packet may be complete when there are no more tags for the packet or when the last tag indicates processing is to stop (e.g., certain of the UN tags illustrated in Table I). Some tags may indicate that the next processing stage for the packet is "layer 3 processing." The beginning of layer 3 processing may be performed after the end of layer 2 processing.

When the tags for a packet have been processed, (block 650—NO), the required processing for the packet may be indicated as one or more parser targets. The parser targets may be processed (block 660) to complete the forwarding or switching of the packet by routing/switching component 230. For example, the destination address and the appropriate one of output ports 130 may be determined and the control information for the packet may be modified in preparation for transmitting the packet to the determined output port 130.

As previously mentioned, the parsing of the AI tags, to determine the parser targets, may be performed based on a stack of received AI tags. One example implementation for performing the processing of the AI tags will next be discussed.

Figure 7:
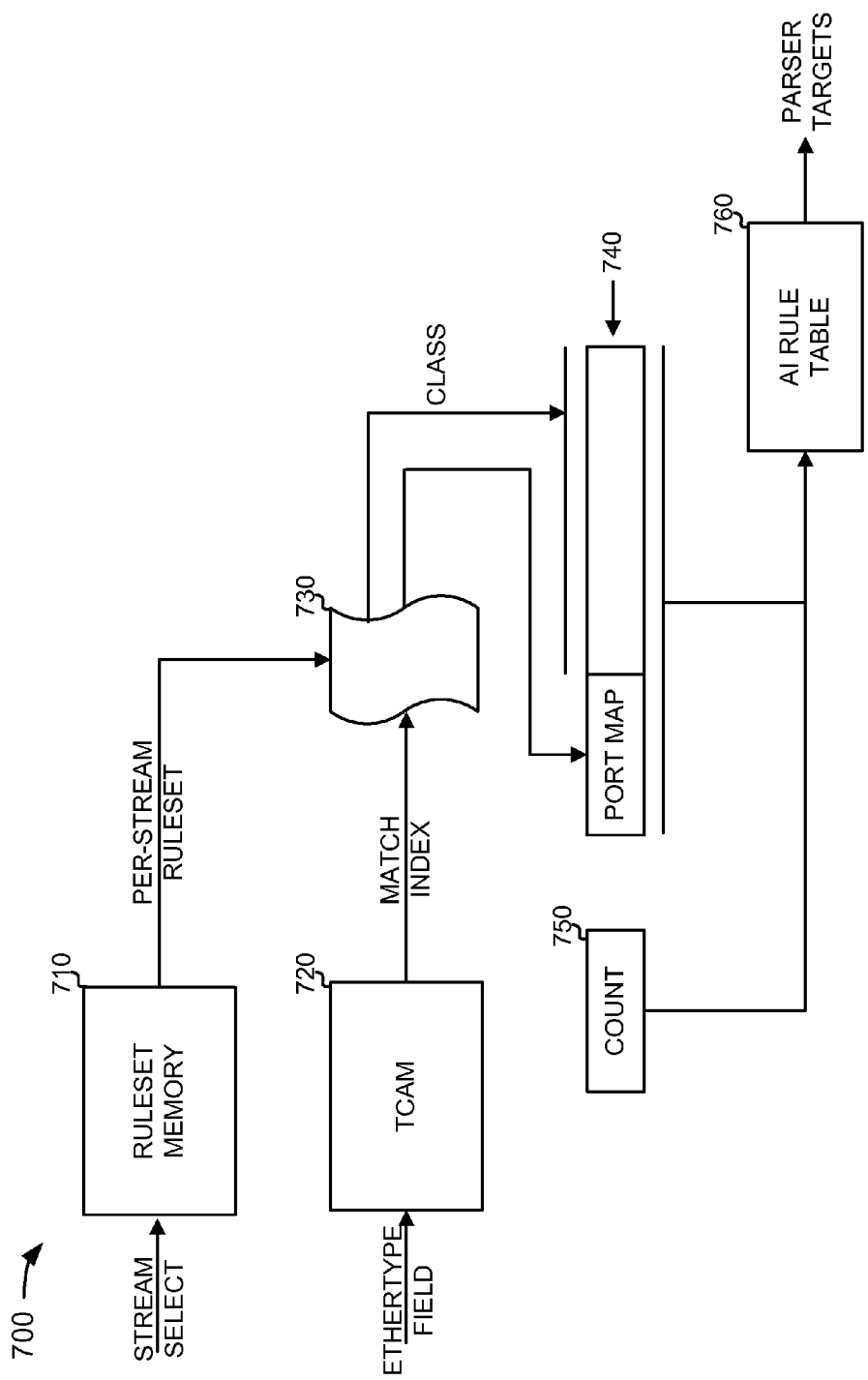
FIG. 7 is a diagram illustrating an example of a circuit used to process AI tags.

FIG. 7 is a diagram illustrating an example of a circuit 700 used to process AI tags. In general, circuit 700 may provide for AI tag processing to be performed in terms of groupings of AI EtherTypes of like behavior, location of the AI tags in a stack of received AI tags, and the number of AI tags in the stack. The result of the operation of circuit 700 may include one or more parser targets. As shown, circuit 700 may include ruleset memory 710, TCAM 720, match component 730, class stack 740, count register 750, and AI rule table 760.

Ruleset memory 710 may include a number of predefined rulesets. Each ruleset may apply to one or more streams, ports, or applications. An input signal (STREAM SELECT) may be used to select the current ruleset, which may be provided, as a per-stream ruleset, to match component 730.

TCAM 720 may include a TCAM that receives the EtherType field for a particular tag. TCAM 720 may generate a match index as a result of comparing the input EtherType field to TCAM 720. The match index may be used to lookup the particular rule, in the ruleset that is stored in match component 730. In one implementation, the looked-up rule may include a two-bit class (CLASS) value and a three-bit port value (PMAP) that are stored in class stack 740. Class values from successive AI tags may be stored in different locations in class stack 740. Count register 750 may store an indication of the number of AI tags received for the packet being processed.

Class stack 740, when completed based on all of the received AI tags for the packet, in conjunction with the count value stored in count register 750, may be used as an address into AI rule table 760. AI rule table 760 may include a memory that relates the input address to values that may include parser targets or values that may be used to derive the parser targets.

As described above with respect to FIG. 7, multiple AI tags may be used to create an AI tag stack, where the stack may be interpreted, along with other values such as a count of the number of received AI tags, to obtain a final set of parser targets.

As discussed above, layer 2 packet parsing techniques were described that classify packet header tags to provide for the flexible handling of various combinations and lengths of header tags. Additionally, the layer 2 packet parsing techniques may operate to disambiguate certain tags, classified as ambiguous and interposable, by analyzing the ambiguous and interposable tags as a group.

It may generally be desirable for device 100, when processing packets, to be able to determine whether a particular packet is a control packet. A control packet may be defined as a packet that is not involved in data transfer. Control packets may be forwarded, from the data plane to the control plane, for further analysis by software.

Figure 8:
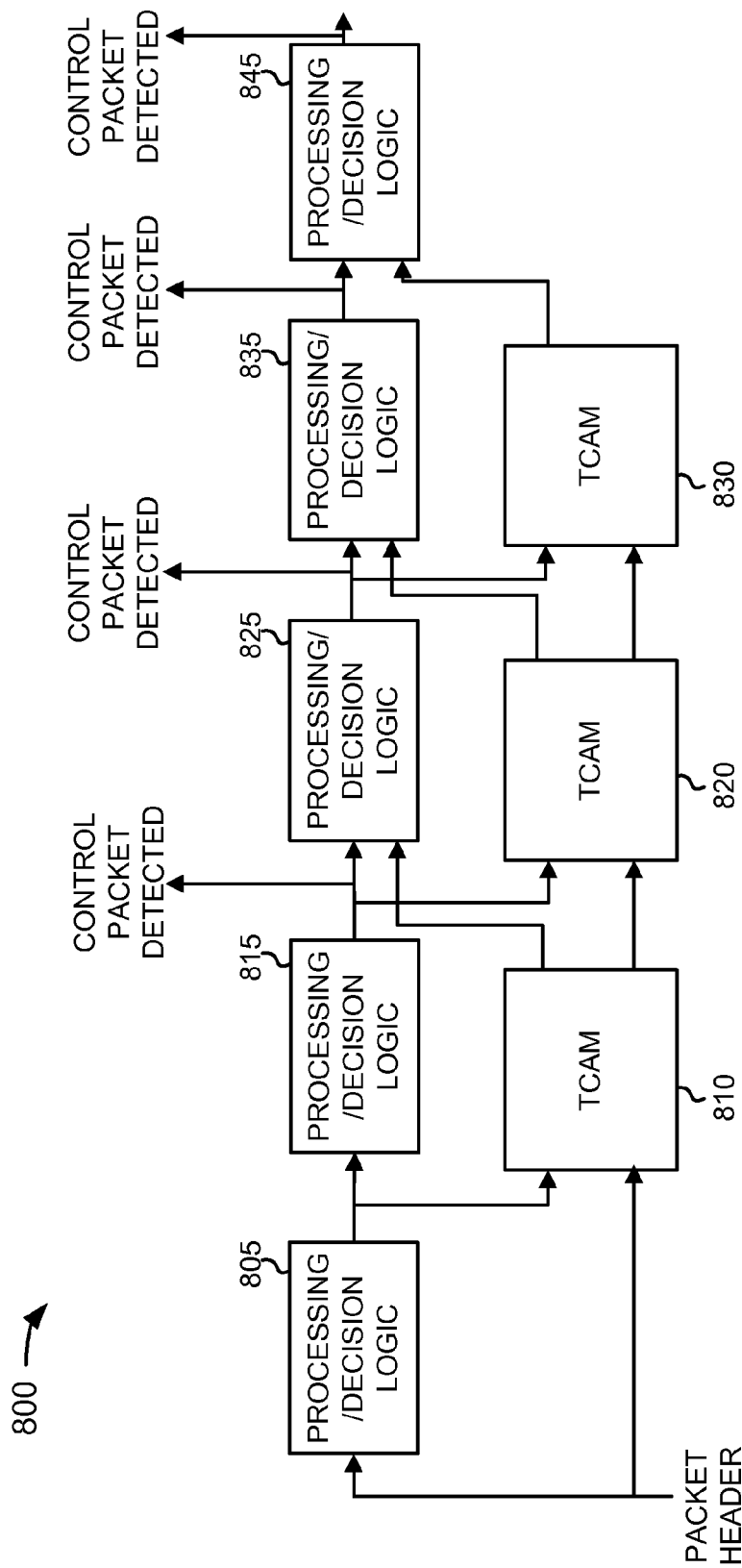
FIG. 8 is a diagram conceptually illustrating an example pipeline that may be used to determine when a packet is a control packet.

FIG. 8 is a diagram conceptually illustrating an example pipeline 800 that may be used to determine when a packet is a control packet. Pipeline 800 may be implemented by, for example, routing/switching component 230. Pipeline 800 may operate on both layer 2 and layer 3 information.

Pipeline 800 may include a number of processing stages, where each processing stage may examine one or more sections of packet header information relating to a particular packet. The processing stages of pipeline 800 may be implemented by TCAMs 810, 820, and 830, and corresponding processing/decision logic 805, 815, 825, 835, and 845. In general, control packets may be identified by pipeline 800, which may then forward the control packets for additional processing or other actions may be taken with respect to the control packets. The control packets that are to be identified may be a particular set of one or more types of control packets that are selected ahead of time. TCAMs 810-830 and processing/decision logic 815-845 may be designed and/or programmed based on the properties of the control packets that are desired to be detected.

TCAMs 810-830 may include TCAMs designed to match incoming packet sections to known control packets. Although illustrated as TCAMs in FIG. 8, in alternative implementations, TCAMs 810-830 may be implemented using other techniques, such as CAMs or other searchable memories. Processing/decision logic 815-845 may include logic, such as buffers or processing logic, to synchronize pipeline 800, provide selection of particular sections of packets, and/or to make decisions relating to whether a packet should be classified as a control packet.

Pipeline 800 may simultaneously process a number of packets. For example, each stage of pipeline 800 may, at any particular time, be processing a different packet. In some implementations, not all packets may be input to pipeline 800. For instance, the population of incoming packets may be narrowed by not processing packets that includes certain errors, packets of a certain type, or packets which fail tests, such as consistency checks, performed in another portion of routing/switching component 230.

TCAMs 810-830 may compare select sections of an incoming packet header to determine whether the section of the packet header matches a particular pattern. For example, TCAM 810 may receive, from processing/decision logic 805, the destination MAC address from an incoming packet. Certain values of the destination MAC address may indicate that the packet is a control packet or may indicate further checks that can be performed, in later stages of pipeline 800, to determine whether the packet is a control packet. Similar processing may be performed by each successive stage of pipeline 800.

As illustrated, a decision of whether a particular packet is detected as a control packet may be made at the egress of the pipeline, such as by processing/decision logic 845, or may be made at an earlier stage in the pipeline. For instance, each stage the pipeline 800 may operate to check for a number of possible types of control packets. A packet that traverses all of pipeline 800 without being detected as being a control packet may be assumed to not be a control packet.

Although FIG. 8 shows an example pipeline 800, in other implementations, pipeline 800 may include fewer components, different components, differently arranged components, or additional components than depicted in FIG. 8. Alternatively, or additionally, one or more of the components of pipeline 800 may perform one or more other tasks described as being performed by one or more of other components of pipeline 800. As a particular example, although three TCAMs 810-830 and five processing/decision logic components 805-845 are illustrated in FIG. 8, in alternative implementations, more or fewer of TCAMs 810-830 and/or processing/decision logic components 805-845 may be used.

Figure 9:
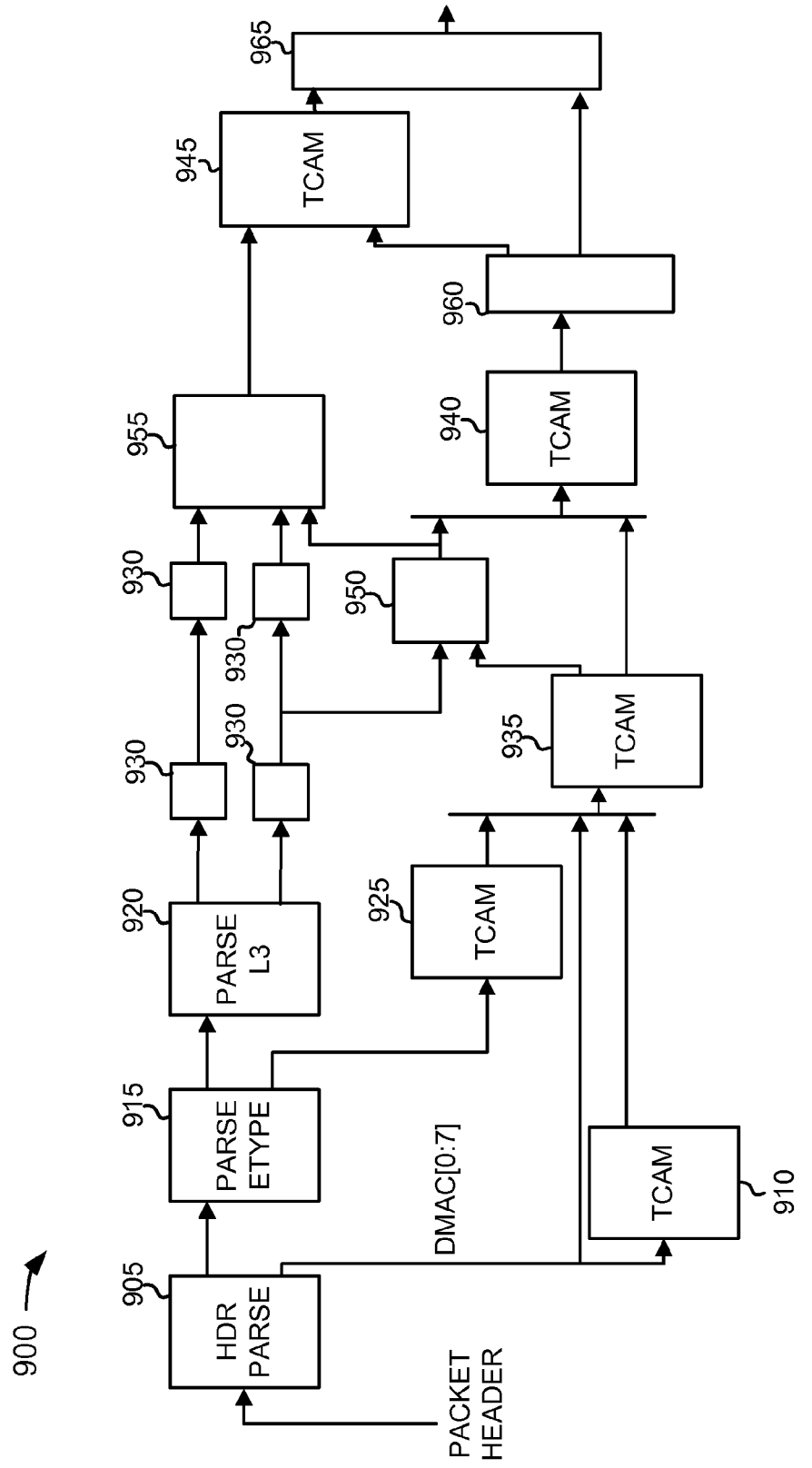
FIG. 9 is a diagram of an example of another pipeline that may be used to determine when a packet is a control packet.

FIG. 9 is a diagram of an example of a pipeline 900. Pipeline 900 may include a more detailed representation of an example implementation of pipeline 800.

Pipeline 900 may receive packet header information at a first parsing component, labeled as header (HDR) parse 905. Header parse 905 may extract certain sections or fields from the packet header. For example, as shown, eight bits of the destination MAC address (DMAC[0:7]) may be provided from header parse 905 to TCAM 910. Additional parsing components, parse EtherType (ETYPE) 915 and parse L3 920 are also illustrated in FIG. 9. Parse ETYPE 915 may generally correspond to layer 2 parsing based on EtherType fields, as discussed previously. Parse L3 920 may correspond to layer 3 packet header parsing that may be performed by packet routing/switching component 230. Both parse ETYPE 915 and parse L3 920, in addition to substitute values relating to the parsing operations, may output additional signals relating to the identification of control packets by pipeline 900. As shown, parse ETYPE 915 may output signals to TCAM 925.

Pipeline 900 may additionally include buffers 930, TCAMs 935, 940, and 945, and decision blocks 950, 955, 960, and 965. Buffers 930 may generally function to coordinate the timing of the signals input to the different stages of pipeline 900. TCAMs 935, 940, and 945 may each operate similarly to TCAMs 910 and 925, such as by each receiving an input search value, looking up the input search value, and outputting an indication of whether the search value was found in the TCAM. Decision blocks 950, 955, 960, and 965 may function to provide inputs to the TCAMs and to interpret the output values from the TCAMs. The final stage of pipeline 900, which may include TCAM 945 and decision block 965, may output a value that indicates whether the packet is a control packet. In one implementation, the value may identify a class or category of the packet, in which, certain classes or categories may correspond to control packets. Control packets may subsequently be trapped or snooped by packet routing/switching component 230.

As described above with respect to FIGS. 8 and 9, a high-speed hardware pipeline may identify control packets. The pipeline may be based on a number of CAM stages, where each CAM stage may use incoming packet information and the results of an upstream CAM stage to calculate an intermediate result. The final stage of the pipeline may produce a class or category value that may indicate whether a particular packet is a control packet.

The foregoing description of implementations provides illustration and description, but is not intended to be exhaustive or to limit the implementations to the precise form disclosed. Modifications and variations are possible in light of the above disclosure or may be acquired from practice of the disclosure.

For example, while a series of blocks has been described with regard to FIG. 6, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a device, a packet, of a packet stream,
      the packet including a plurality of control tags in a header portion of the packet;
   determining, by the device, a value stored in a first field of a first control tag of the plurality of control tags;
   performing, by the device, a lookup operation, using the value, to determine a first index value;
   obtaining, by the device and based on the first index value, a ruleset, associated with processing the plurality of control tags, from a memory;
   determining, by the device and based on the value, a second index value that references an entry in the ruleset;
   determining, by the device and based on the entry, a length of the first control tag and a category associated with the first control tag,
      the category associated with the first control tag indicating that the first control tag corresponds to an unambiguous interposable (UI) control tag,
         the UI control tag being:
            interposable within a sequence, of the plurality of control tags, within the header portion of the packet, and
            uniquely identified by the value;
   determining, by the device and based on the ruleset and the first control tag corresponding to the UI control tag, one or more processing operations, associated with the UI control tag, using the value;
   performing, by the device, the one or more processing operations on the first control tag to determine processing indicated by the first control tag;
   performing, by the device, the processing indicated by the first control tag on the packet; and
   determining a start of a second control tag, of the plurality of control tags, based on the length of the first control tag.

2. The method of claim 1, where the value comprises a first value, the method further comprising:
   determining a second value stored in a first field of the second control tag;
   determining, based on the second value, a category associated with the second control tag,
      the category associated with the second control tag indicating that the second control tag corresponds to an unambiguous non-interposable (UN) control tag,
         the UN control tag being:
            positioned at a known location within the sequence of the plurality of control tags, and
            uniquely identified by the second value;
   determining, based on the ruleset and based on the second control tag corresponding to the UN control tag, that the second control tag indicates a conclusion of a processing of the plurality of control tags; and
   terminating the processing of the plurality of control tags.

3. The method of claim 2, where the known location for the UN control tag is at an end of the sequence of the plurality of control tags.

4. The method of claim 1, where determining the length and the category includes:
   inputting the value into a content addressable memory (CAM) to determine the length and the category.

5. The method of claim 1, further comprising:
   extracting, based on determining the start of the second control tag, the second control tag from the header portion of the packet.

6. The method of claim 1, where the plurality of control tags includes a group of second control tags,
   where the group of second control tags includes the second control tag,
   where the value comprises a first value, and
   where the method further comprises:
      determining a second value stored in a first field of each second control tag, of the group of second control tags;
      determining, based on the second value stored in the first field of each second control tag, that each second control tag corresponds to an ambiguous interposable (AI) control tag that has an ambiguous parsing interpretation,
         the AI control tag not being uniquely identified by the second value, and
         the AI control tag being interposable within the sequence of the plurality of control tags;
      analyzing the group of second control tags based on each second control tag corresponding to the AI control tag and based on the AI control tag having an ambiguous parsing interpretation;
      determining, based on analyzing the group of second control tags and based on the ruleset, one or more processing operations, associated with AI control tags, to perform for the group of second control tags;
      performing the one or more processing operations associated with the AI control tags to determine processing indicated by the group of second control tags; and
      performing the processing indicated by the group of second control tags on the packet.

7. The method of claim 6, where analyzing the group of second control tags includes:
   determining a quantity of second control tags included in the group of second control tags; and
   where determining the one or more processing operations, associated with the AI control tags, to perform includes:
      determining the one or more processing operations, associated with the AI control tags, to perform further based on the quantity of second control tags.

8. The method of claim 1, where determining the one or more processing operations includes:
   forming, for the first control tag, a data structure that is determined based on the first field, where the first field comprises an EtherType field for the first control tag, and
where the data structure includes information extracted from the first control tag.

9. The method of claim 1, further comprising:
determining another value stored in a first field of the second control tag;
determining, based on the other value, that a category associated with the second control tag is unknown; and
categorizing the second control tag in the category associated with the first control tag based on the category associated with the second control tag being unknown.

10. A device comprising:
one or more processors configured to:
receive a packet associated with a packet stream, the packet including a plurality of control tags;
determine a value stored in an EtherType field of a first control tag of the plurality of control tags;
perform a lookup operation, using the value, to determine a first index value;
obtain, based on the first index value and from a memory, a ruleset associated with processing the plurality of control tags;
determine, based on the value, a second index value, the second index value indicating an entry, in the ruleset, associated with the first control tag;
determine, based on the entry, a length of the first control tag and a category associated with the first control tag, the category indicating that the first control tag corresponds to an unambiguous interposable (UI) control tag that is interposable within a sequence of the plurality of control tags in the packet;
determine, based on the ruleset and based on the first control tag corresponding to the UI control tag, one or more processing operations associated with the UI control tag using the value;
perform the one or more processing operations on the first control tag to determine processing indicated by the first control tag;
perform the processing on the packet; and
determine a start of a second control tag, of the plurality of control tags, based on the length of the first control tag.

11. The device of claim 10, where a size of each of the plurality of control tags and a quantity of the plurality of control tags are variable.

12. The device of claim 10, where the value comprises a first value; and
where the one or more processors are further configured to:
determine a second value stored in an EtherType field of the second control tag;
determine, based on the second value, a category associated with the second control tag,
the category associated with the second control tag indicating that the second control tag corresponds to an unambiguous non-interposable (UN) control tag that has a known location within the sequence of the plurality of control tags in the packet;
determine, based on the ruleset and based on the second control tag corresponding to the UN control tag, that the second control tag indicates a conclusion of a processing of the plurality of control tags; and
terminate the processing of the plurality of control tags.

13. The device of claim 12, where the known location for the UN control tag comprises an end of the sequence of the plurality of control tags.

14. The device of claim 10, where, when determining the category, the one or more processors are configured to:
input the value into a content addressable memory (CAM) to determine the category.

15. The device of claim 10, where the value comprises a first value; and
where the one or more processors are further configured to:
determine a second value stored in an EtherType field of each second control tag, of a group of second control tags, of the plurality of control tags,
the group of second control tags including the second control tag;
determine, based on the second value stored in the EtherType field of each second control tag, that each second control tag corresponds to an ambiguous interposable (AI) control tag that has an ambiguous parsing interpretation,
the AI control tag not being uniquely identified by the second value, and
the AI control tag being interposable within the sequence of the plurality of control tags;
analyze the group of second control tags based on each second control tag corresponding to the AI control tag and the AI control tag having an ambiguous parsing interpretation;
determine one or more processing operations associated with the AI control tags based on the ruleset and based on analyzing the group of second control tags;
perform the one or more operations associated with AI control tags to determine processing indicated by the group of second control tags; and
perform the processing indicated by the group of second control tags on the packet.

16. A non-transitory computer-readable medium storing instructions, the instructions comprising:
one or more instructions that, when executed by a processor, cause the processor to:
receive a packet associated with a packet stream, the packet including a plurality of control tags in a header portion of the packet;
perform, using a value stored in an EtherType field of a first control tag of the plurality of control tags, a lookup operation to determine a first index value;
obtain, based on the first index value, a ruleset, associated with processing the plurality of control tags, from a memory;
determine, based on the value, a second index value, the second index value indicating an entry in the ruleset;
determine, based on the entry, a length of the first control tag and a category associated with the first control tag, the category indicating that the first control tag corresponds to an unambiguous interposable (UI) control tag that is interposable within a sequence, of the plurality of control tags, in the header portion of the packet;
determine, based on the ruleset and based on the first control tag corresponding to the UI control tag, one or more processing operations, associated with the first control tag, using the value;
perform the one or more processing operations on the first control tag to determine processing indicated by the first control tag;
perform the processing indicated by the first control tag on the packet; and determine a start of a second control tag, of the plurality of control tags, based on the length of the first control tag.

17. The non-transitory computer-readable medium of claim 16, where the value comprises a first value, the instructions further comprising:
one or more instructions that, when executed by the processor, cause the processor to:
determine a second value stored in an EtherType field of the second control tag;
determine, based on the second value, a category associated with the second control tag,
the category associated with the second control tag indicating that the second control tag corresponds to an unambiguous non-interposable (UN) control tag that has a known location within the sequence of the plurality of control tags;
determine, based on the second control tag corresponding to the UN control tag, a particular rule from the ruleset; and
terminate a processing of the plurality of control tags based on the particular rule.

18. The non-transitory computer-readable medium of claim 16, where the one or more instructions to determine the length and the category include:
one or more instructions that, when executed by the processor, cause the processor to input the value into a content addressable memory (CAM) to determine the length and the category.

19. The non-transitory computer-readable medium of claim 16, where the value comprises a first value, the instructions further comprising:
one or more instructions that, when executed by the processor, cause the processor to:
determine a second value stored in an EtherType field of each second control tag of a group of second control tags of the plurality of control tags,
the group of second control tags including the second control tag;
determine, based on the second value stored in the EtherType field of each second control tag, that each second control tag corresponds to an ambiguous interposable (AI) control tag that has an ambiguous parsing interpretation;
analyze the group of second control tags based on each second control tag corresponding to the AI control tag that has the ambiguous parsing interpretation;
determine one or more processing operations associated with the AI control tags based on the ruleset and based on analyzing the group of second control tags; and
perform the one or more processing operations associated with the AI control tags on the packet.

20. A device comprising:
one or more processors configured to:
receive a packet, of a packet stream,
the packet including a plurality of control tags in a header portion of the packet;
determine a value stored in a first field of a first control tag of the plurality of control tags;
perform a lookup operation, using the value, to determine a first index value;
obtain, based on the first index value and from a memory, a ruleset associated with processing the plurality of control tags;
determine, based on the value, a second index value that references an entry in the ruleset;
determine, based on the entry, a length of the first control tag and a category associated with the first control tag,
the category associated with the first control tag indicating that the first control tag corresponds to an unambiguous interposable (UI) control tag,
the UI control tag being:
interposable within a sequence, of the plurality of control tags, within the header portion of the packet, and
uniquely identified by the value;
determine, based on the ruleset and the first control tag corresponding to the UI control tag, one or more processing operations, associated with the UI control tag, using the value;
perform the one or more processing operations on the first control tag to determine processing indicated by the first control tag;
perform the processing indicated by the first control tag on the packet; and
determine a start of a second control tag, of the plurality of control tags, based on the length of the first control tag.

21. The device of claim 20, where the value comprises a first value; and
where the one or more processors are further configured to:
determine a second value stored in a first field of the second control tag;
determine, based on the second value, a category associated with the second control tag,
the category associated with the second control tag indicating that the second control tag corresponds to an unambiguous non-interposable (UN) control tag,
the UN control tag being:
positioned at a known location within the sequence of the plurality of control tags, and
uniquely identified by the second value;
determine, based on the ruleset and based on the second control tag corresponding to the UN control tag, that the second control tag indicates a conclusion of a processing of the plurality of control tags; and
terminate the processing of the plurality of control tags.

22. The device of claim 21, where the known location for the UN control tag is at an end of the sequence of the plurality of control tags.

* * * * *